(12) United States Patent
Figueira et al.

(10) Patent No.: US 11,133,990 B2
(45) Date of Patent: Sep. 28, 2021

(54) SYSTEM AND METHOD FOR PROVIDING A DYNAMIC COMPARATIVE NETWORK HEALTH ANALYSIS OF A NETWORK ENVIRONMENT

(71) Applicant: Extreme Networks, Inc., San Jose, CA (US)

(72) Inventors: Norival Figueira, Campbell, CA (US); Shyamsundar Pullela, San Jose, CA (US); Alan Amrod, Jupiter, FL (US)

(73) Assignee: Extreme Networks, Inc., San Jose, CA (US)

( * ) Notice: Subject to any disclaimer, the term of this patent is extended or adjusted under 35 U.S.C. 154(b) by 0 days.

(21) Appl. No.: 16/401,106

(22) Filed: May 1, 2019

(65) Prior Publication Data

US 2019/0342180 A1 Nov. 7, 2019

Related U.S. Application Data

(60) Provisional application No. 62/665,440, filed on May 1, 2018.

(51) Int. Cl.
*H04L 12/24* (2006.01)
*H04L 12/26* (2006.01)

(52) U.S. Cl.
CPC .......... *H04L 41/14* (2013.01); *H04L 41/0816* (2013.01); *H04L 41/22* (2013.01); *H04L 43/06* (2013.01)

(58) Field of Classification Search
CPC ..... H04L 12/24; H04L 41/0816; H04L 67/10; G06F 11/0793
USPC ............................................. 709/221
See application file for complete search history.

(56) References Cited

U.S. PATENT DOCUMENTS

| | | | | |
|---|---|---|---|---|
| 2007/0268294 A1* | 11/2007 | Eagen | ...................... | H04L 41/22 345/474 |
| 2013/0117855 A1* | 5/2013 | Kim | ...................... | G06F 21/577 726/24 |
| 2015/0193325 A1* | 7/2015 | Harsan-Farr | ........ | G06F 11/3409 702/186 |
| 2017/0054605 A1* | 2/2017 | Duncan | ................. | H04L 41/145 |

(Continued)

*Primary Examiner* — Mahran Y Abu Roumi
(74) *Attorney, Agent, or Firm* — Sterne, Kessler, Goldstein & Fox P.L.L.C.

(57) ABSTRACT

A system and method for providing a dynamic comparative network health analysis of a network environment, the method comprising: obtaining dynamic and static network environment parameters of a plurality of network environments; creating network environment profiles of each network environment of the plurality of network environments based on the dynamic and static network environment parameters; performing comparative analysis of network environment profiles of a first network environment of the plurality of network environments with network environment profiles of a second network environment of the plurality of network environments to generate a comparative analysis; based on the comparative analysis, determining whether to reconfigure the first network environment or create a new network environment; if it is determined to reconfigure the first network environment, generating a remedial plan for the first network environment; if it is determined to create a new network environment, generating a new plan for the new network environment.

20 Claims, 7 Drawing Sheets

(56) References Cited

U.S. PATENT DOCUMENTS

2017/0171026 A1* 6/2017 Lucas ................. G06F 11/1441
2017/0228227 A1* 8/2017 Winterfeldt ........... G06F 9/5072
2019/0166009 A1* 5/2019 Parvin ................ H04L 41/0803

* cited by examiner

SYSTEM AND METHOD FOR PROVIDING A DYNAMIC COMPARATIVE NETWORK HEALTH ANALYSIS OF A NETWORK ENVIRONMENT

CROSS-REFERENCE TO RELATED APPLICATIONS

This application claims priority to U.S. Provisional Patent Application Ser. No. 62/665,440, filed May 1, 2018 and entitled "Comparative Analytics," which is hereby incorporated by reference herein.

DETAILED DESCRIPTION

Figure 1:
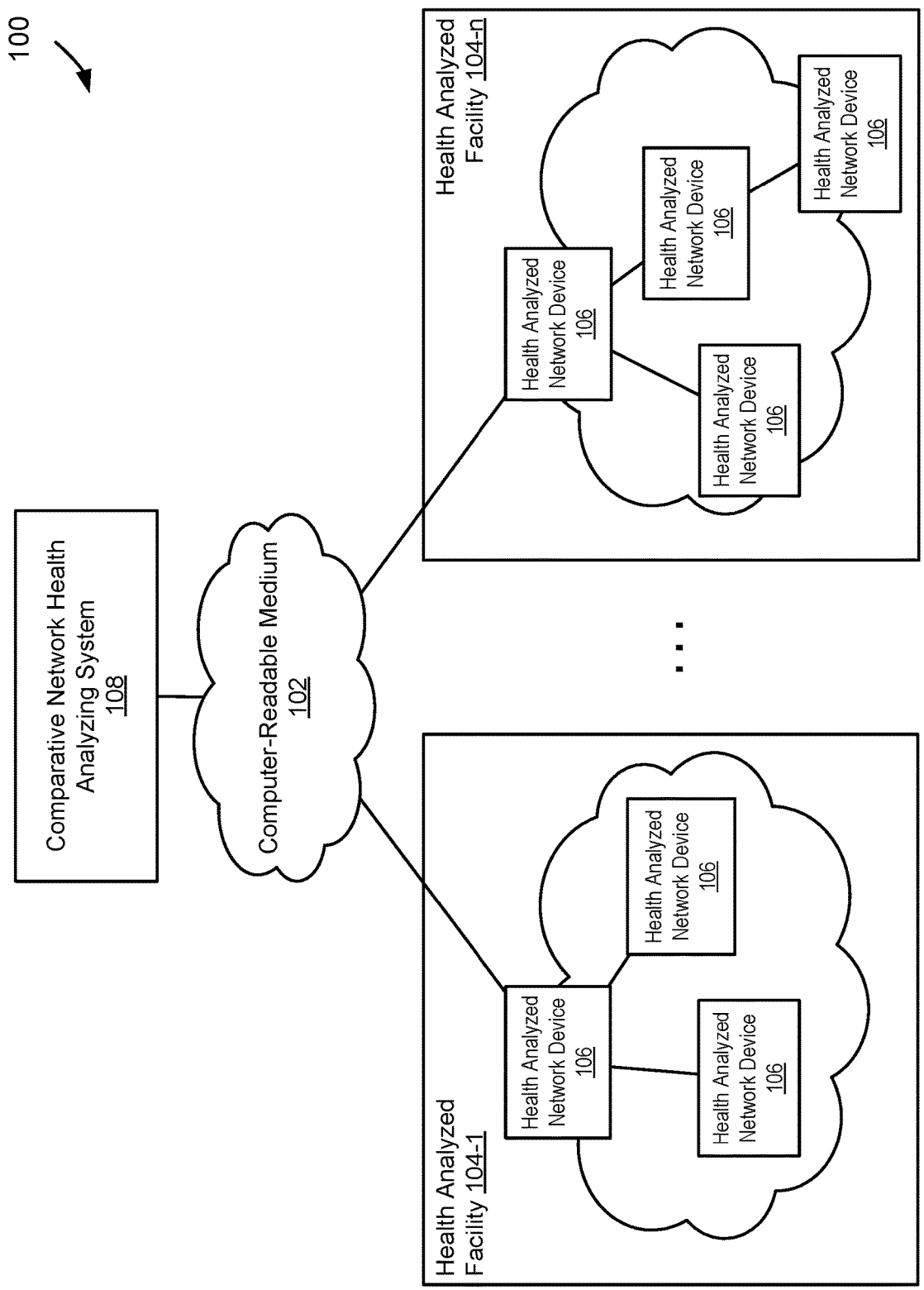
FIG. 1 depicts a diagram of an example of a system for providing a dynamic comparative network health analysis of a network environment.

FIG. 1 depicts a diagram 100 of an example of a system for providing a dynamic comparative network health analysis of a network environment. The diagram 100 includes a computer-readable medium 102, a health analyzed facility 104-1 to a health analyzed facility 104-n (hereinafter collectively referred to as health analyzed facilities 104) coupled to the computer-readable medium 102, and a comparative network health analyzing system 108 coupled to the computer-readable medium.

The computer-readable medium 102 is intended to represent a variety of potentially applicable technologies. For example, the computer-readable medium 102 can be used to form a network or part of a network. Where two components are co-located on a device, the computer-readable medium 102 can include a bus or other data conduit or plane. Where a first component is co-located on one device and a second component is located on a different device, the computer-readable medium 102 can include a wireless or wired back-end network or LAN. The computer-readable medium 102 can also encompass a relevant portion of a WAN or other network, if applicable.

As used in this paper, a "computer-readable medium" is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

Computer-readable mediums, systems, and devices described in this paper can be implemented as a computer system, a plurality of computer systems, or parts of a computer system or plurality of computer systems. In general, a computer system will include a processor, memory, non-volatile storage, and an interface and the examples described in this paper assume a stored program architecture, though that is not an explicit requirement of the machine. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller. A typical CPU includes a control unit, arithmetic logic unit (ALU), and memory (generally including a special group of memory cells called registers).

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

In stored program architectures, software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more modem or network interface. It will be appreciated that a modem or network interface can be considered to be part of the computer system. The interface can include an analog modem, ISDN modem, cable modem, token ring interface, satellite transmission interface (e.g. "direct PC"), or other interfaces for coupling a computer system to other computer systems. Interfaces enable computer systems and other devices to be coupled together in a network.

The computer systems can be compatible with or implemented as part of or through a cloud-based computing system. As used in this paper, a cloud-based computing system is a system that provides virtualized computing resources, software and/or information to client devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their client device.

A computer system can be implemented as an engine, as part of an engine, or through multiple engines. As used in this paper, an engine includes one or more processors or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors, or a first engine and a second engine can share one or more processors with one another or other engines. Depending upon implementation-specific or other considerations, an engine can be centralized or its functionality distributed. An engine can include hardware, firmware, or software embodied in a computer-readable medium for execution by the processor. The processor transforms data into new data using implemented data structures and methods, such as is described with reference to the figures in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a general—or specific—purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud-based datastore is a datastore that is compatible with cloud-based computing systems and engines.

Referring once again to the example of FIG. 1, the health analyzed facilities 104 are intended to represent facilities in which a network to be subjected to a dynamic comparative network health analysis is established. Depending upon implementation-specific or other considerations, the health analyzed facilities 104 include one or more of a building, a floor of a building, an area of a floor of a building, an outdoor space, a public space, a public transportation space, or the like. For example, a plurality of health analyzed facilities 104 may be associated with real property of a single entity (e.g., enterprise). In another example, a single health analyzed facility 104 may be associated with real property of a single entity. A health analyzed facility 104 includes one or more health analyzed network devices 106 that form a communication network within the health analyzed facility 104. In a specific implementation, a network environment comprises an entity associated with one or more of the health analyzed facilities 104, one of the health analyzed facilities 104 including one or more health analyzed network devices 106, a plurality of health analyzed network devices 106 coupled to each other, and/or a single health analyzed network device 106.

In the example of FIG. 1, the health analyzed network device 106 is intended to represent a network device that generates a network environment report that can be used for comparative network health analysis. A network environment report includes one or more network environment values obtained or determined at the health analyzed network devices 106 and associated with relevant ones of the health analyzed facilities 104. In a specific implementation, the health analyzed network device 106 is a wireless access point (WAP). In an 802.11-compliant implementation, a WAP is a networking hardware device that allows a wireless device to connect to a backbone network in compliance with the IEEE 802.11 standard. IEEE 802.11a-1999, IEEE 802.11b-1999, IEEE 802.11g-2003, IEEE 802.11-2007, and IEEE 802.11n TGn Draft 8.0 (2009) are incorporated by reference. In a specific implementation, a wireless device is a thin client device or an ultra-thin client device. The wireless device can include a wireless network interface, through which the wireless device can receive data wirelessly through a wireless communication channel. The wireless network interface can be used to send data generated by the client device to remote or local systems, servers, engines, or datastores through a wireless communication channel. In a specific example, the wireless communication channel is a cellular communication channel. In an 802.11-compatible or 802.11-compliant implementation, a wireless device is 802.11 standards-compatible or 802.11 standards-compliant.

As used in this paper, a system or device that is 802.11 standards-compatible or 802.11 standards-compliant complies with at least some of one or more of the incorporated documents' requirements and/or recommendations, or requirements and/or recommendations from earlier drafts of the documents, and includes Wi-Fi systems. Wi-Fi is a non-technical description that is generally correlated with the IEEE 802.11 standards, as well as Wi-Fi Protected Access (WPA) and WPA2 security standards, and the Extensible Authentication Protocol (EAP) standard. In alternative embodiments, an AP may comply with a different standard other than Wi-Fi or IEEE 802.11, such as Bluetooth and ZigBee, may be referred to as something other than an "access point," and may have different interfaces to a wireless or other medium.

IEEE 802.3 is a working group and a collection of IEEE standards produced by the working group defining the physical layer and data link layer's MAC of wired Ethernet. This is generally a local area network technology with some wide area network applications. Physical connections are typically made between nodes and/or infrastructure devices (hubs, switches, routers) by various types of copper or fiber cable. IEEE 802.3 is a technology that supports the IEEE 802.1 network architecture. As is well-known in the relevant art, IEEE 802.11 is a working group and collection of standards for implementing wireless local area network (WLAN) computer communication in the 2.4, 3.6 and 5 GHz frequency bands. The base version of the standard IEEE 802.11-2007 has had subsequent amendments. These standards provide the basis for wireless network products using the Wi-Fi brand. IEEE 802.1 and 802.3 are incorporated by reference.

Referring once again to the example of FIG. 1, the comparative network health analyzing system 108 is intended to represent hardware configured to carry out a dynamic comparative network health analysis of a plurality of network environments. There may be regional legal requirements that mandate use of specific geographical locations. Accordingly, the comparative network health analyzing system 108 can be implemented as a single data center at a single geographical location, as distributed data centers located at multiple geographical locations, or virtually (e.g., in the cloud), as circumstances demand or as otherwise convenient or desirable.

In carrying out the dynamic comparative network health analysis of network environments, the comparative network health analyzing system 108 creates (and updates) network environment profiles of network environments using the obtained network environment parameter values. Depending upon implementation-specific or other considerations, the comparative network health analyzing system 108 creates a network environment profile with respect to each of different categories of network environments. For example, the comparative network health analyzing system 108 creates a network environment profile for an entity, a network environment profile for a health analyzed facility 104 of the entity, a network environment profile for a health analyzed network device 106 of the health analyzed facility 104.

In a specific implementation, the comparative network health analyzing system 108 is configured to perform a dynamic comparative network health analysis using the generated network environment profiles of network environments to generate a dynamic comparative analysis. In a specific implementation, a dynamic comparative analysis includes deviation of values such as an average ($\mu$) and a standard deviation ($\sigma$), with respect to one or more of network environment parameters (dynamic and/or static) with respect to network environment type (e.g., entity, facility, network device) and classification of a network environment in one of a plurality of categories. In a specific implementation, a dynamic comparative analysis includes a health metric of a network environment based on a classification of a network environment parameter.

In a specific implementation, the comparative network health analyzing system 108 is configured to generate a remedial plan of an existing network environment, which is deemed to be in unhealthy network condition, based on the generated dynamic comparative analysis. In a specific implementation, a remedial plan is directed to improving network environment parameter(s) of the existing network environment taking into consideration network configurations of healthier network environments similar to the existing network environment. For example, a remedial plan may include proposals of increase or decrease the number of APs, change of location(s) of existing AP(s), change of wireless communication type (e.g., 801.11ac to 801.11b/g/n), change of a network provider, installation of equipment (e.g. a metal wall) to reduce noise, and so on. In a specific implementation, the comparative network health analyzing system 108 is configured to generate a new plan of a new network environment to be newly configured, based on the generated dynamic comparative analysis. In a specific implementation, a new plan is directed to establishing a healthy network environment with preferable network environment parameter(s) taking into consideration network configurations of healthier network environments similar to the new network environment to be configured. For example, a new plan may include locations of APs in the existing network environment in the same or similar manner as locations of APs in the exemplary network environment profile(s) of healthy network environment(s).

In a specific implementation, the comparative network health analyzing system 108 is configured to provide the generated dynamic comparative analyses of network environments, and/or remedial plan and/or new plan of network environments. In a specific implementation, the dynamic comparative analysis provided by the comparative network health analyzing system 108 is reported to an administrator or network provider, or agents thereof, of the corresponding network environment or other network environments. Similarly, the remedial plan and/or new plan of network environment provided by the comparative network health analyzing system 108 is reported to an administrator or network provider, or agents thereof, of the corresponding network environment or other network environments. In a specific implementation, a person at one of the health analyzed facilities 104 can use a wireless device to view and perhaps interact with network health information from the comparative network health analyzing system 108 provided via one of the health analyzed network devices 106. For example, the wireless device can display information about available bandwidth.

In an example of operation of the example system shown in FIG. 1, the health analyzed network devices 106 in the health analyzed facilities 104 are coupled to client devices to allow the client devices to connect to a backbone network of the relevant one of the health analyzed facilities 104. The health analyzed network devices 106 transmit data to and from client devices coupled thereto. The comparative network health analyzing system 108 obtains network environment parameters, including dynamic network environment parameters, from the plurality of health analyzed network devices 106. The comparative network health analyzing system 108 generates network environment profiles for network environments of the health analyzed facilities 104 using the obtained network environment parameters and performs a comparative analysis of the generated network environment profiles to generate a dynamic comparative analysis. If appropriate, the comparative network health analyzing system 108 generates a remedial plan of an existing network environment to be reconfigured and/or a new plan of a new network environment to be configured based on the generated dynamic comparative analysis. The comparative network health analyzing system 108 provides the generated dynamic comparative analysis, the remedial plan, and/or the new plan as a report.

Advantageously, a dynamic comparative analysis as described is capable of providing information about health of a network environment relative to other network environments, which enables comparison and improvement of network performance of the network environment. Further, a dynamic comparative analysis provided according to the example system can be employed in generating a remedial plan to reconfigure the network environment and/or a new plan to configure a new network environment.

Figure 2:
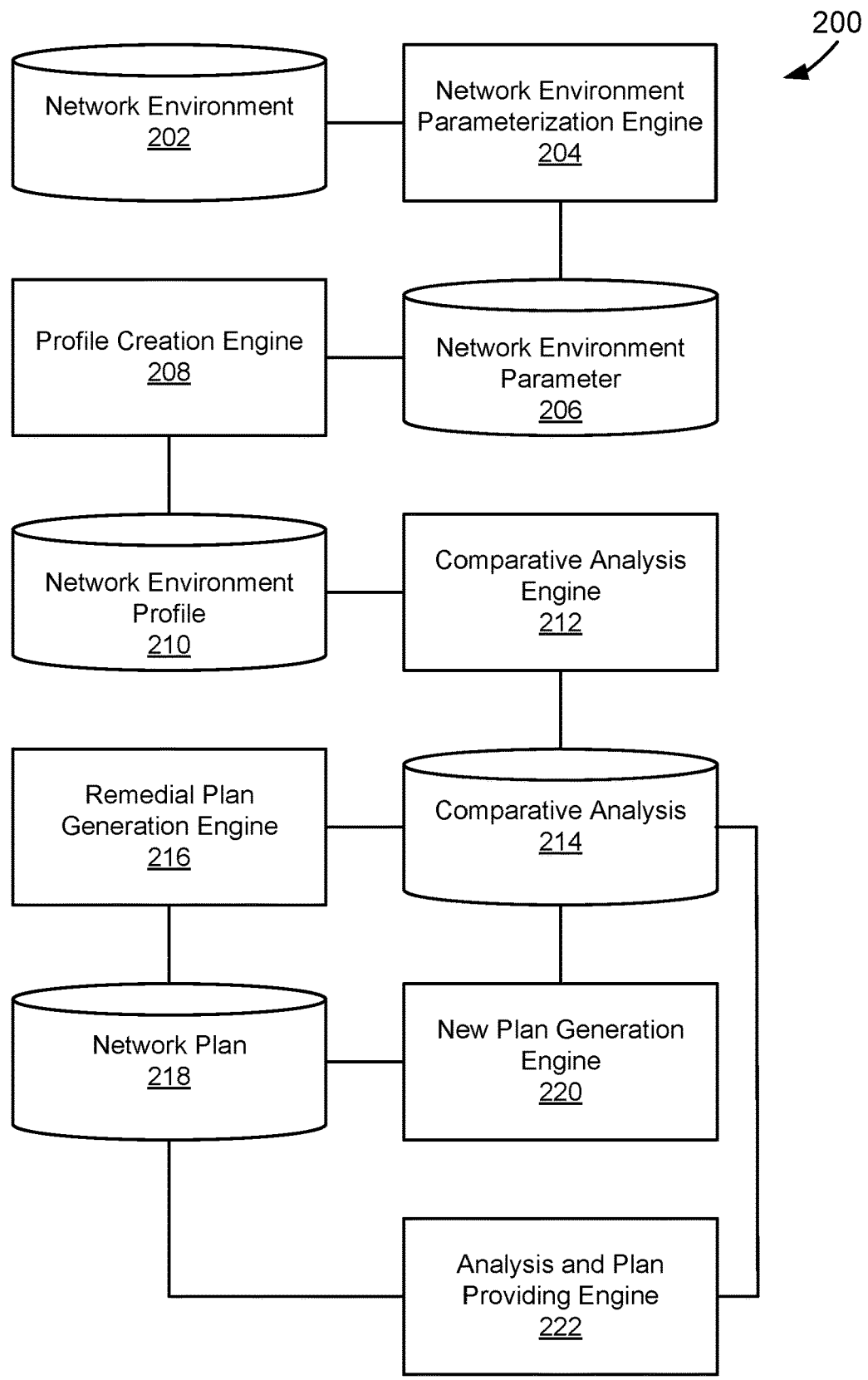
FIG. 2 depicts a diagram of an example of a dynamic comparative network health analysis system.

FIG. 2 depicts a diagram 200 of an example of a dynamic comparative network health analysis system. The diagram 200 includes a network environment datastore 202, a network environment parameterization engine 204 coupled to the network environment datastore 202, a network environment parameter datastore 206 coupled to the network environment parameterization engine 204, a profile creation engine 208 coupled to the network environment parameter datastore 206, a network environment profile datastore 210 coupled to the profile creation engine 208, a comparative analysis engine 212 coupled to the network environment profile datastore 210, a comparative analysis datastore 214 coupled to the comparative analysis engine 212, a remedial plan generation engine 216 coupled to the comparative analysis datastore 214, a network plan datastore 218 coupled to the remedial plan generation engine 216, a new plan generation engine 220 coupled to the comparative analysis datastore 214 and the network plan datastore 218, and an analysis and plan providing engine 222 coupled to the comparative analysis datastore 214 and the network plan datastore 218. In a specific implementation, the comparative network health analyzing system 204 corresponds to the comparative network health analyzing system 108 in FIG. 1.

In the example of FIG. 2, the network environment datastore 202 is intended to represent a datastore of network environment values obtained from a plurality of network environments. In a specific implementation, the network environment data includes static network environment values from a network environment report transmitted from health analyzed network devices and obtains dynamic network environment values from a network environment (e.g., AP, switch, etc.) and/or based on analysis of data traffic through the network environment. Alternatively or in addition, an administrator or human or artificial agent thereof can provide static network environment values. In a specific implementation, the dynamic network environment values are updated periodically with a predetermined interval (e.g., 10-30 sec).

In the example of FIG. 2, the network environment parameterization engine 204 is intended to represent hardware configured to parameterize those network environment values that are important for network health analysis. Depending upon implementation-specific or other considerations, the network environment parameters include static network environment parameters, dynamic network environment parameters, or both static and dynamic network environment parameters. Static network environment parameters can include, for example, one or more of a geographic location (e.g., state, city, etc.), a type of use (e.g., private office space, public customer space, etc.), a type of industry (e.g., education, healthcare, manufacturing, office, stores, etc.), a type of the network environment (e.g., a floor of a building, an open outdoor space, a public transportation, etc.), a type of wireless connection (e.g., 801.11ac), a size of organization (e.g., 1-10 APs, 11-100 APs, 101-500 APs, etc.), an area of the network environment (e.g., a footprint), and the number (or range) of APs, and expected number (or range) of client devices. Dynamic network environment parameters can include, for example, one or more of bandwidths (e.g., entity-based, facility-based, AP-based, client-based), the number of client devices, the number of client devices per network device (e.g., AP, switch, etc.), and a WAN latency, at a point in time. Alternatively or in addition, the dynamic network environment parameters include one or more of an average bandwidth usage of a specific network device over a span of time (e.g., day, week, month, etc.), an average bandwidth of network devices in a network environment over a span of time, an average number of client devices coupled to a specific network device during a span of time, an average number of client devices coupled to network devices in a network environment over a span of time. In a specific implementation, client devices are weighted differently based on applicable criteria such as a wireless communication protocol (e.g., 801.11ac is heavier than 801.11a because of data rates). The network environment parameterization engine 204 is configured to store network environment parameters in the network environment parameter datastore 206.

In the example of FIG. 2, the network environment parameter datastore 206 is intended to represent a datastore of network environment parameters used to assess network health. In a specific implementation, the parameter datastore 208 is configured to form a network environment parameter table including a plurality of entries each of which includes values of a network environment identifier, a parameter obtained time (e.g., timestamp), and one or more static network environment parameters and/or one or more dynamic network environment parameters. The network environment identifier may or may not use network environment identifiers for different types of networks. For example, the network environment identifier can include network environment identifiers for network entities (managing one or more facilities), network facilities (including one or more network devices), and network devices (e.g., APs, switches, etc.). In a specific implementation, when the parameter datastore 208 becomes stale (or as a matter of course to avoid stale entries), the parameter datastore 208 discards data stored therein in accordance with an applicable criteria (discard old data, replace older entries with newer entries for each network environment identifier, etc.).

In the example of FIG. 2, the profile creation engine 208 is intended to represent hardware configured to create network environment profiles of network environments using the network environment parameters stored in the parameter datastore 206. In a specific implementation, the profile creation engine 208 retrieves network environment parameters of a specific network environment identifier from the parameter datastore 206 periodically, when the parameters are modified, or in accordance with some other trigger and generates a network environment profile of the corresponding network environment based on the retrieved network environment parameters. In a specific implementation, the profile creation engine 208 dynamically updates a network environment profile of a network environment periodically with a predetermined interval (e.g., 10-30 sec). In a specific implementation, the profile creation engine 208 is configured to store the generated network environment profiles of network environments in the network environment profile datastore 210.

The network environment profile datastore 210 is intended to represent a datastore of network environment profiles generated by the profile creation engine 208. In a specific implementation, the network environment profile datastore 210 is configured to form a network environment profile table including a plurality of entries each of which includes values of a network environment identifier, one or more static network environment parameters, and history of one or more dynamic network environment parameters during a predetermined period of time. In a specific implementation, when the network environment profile datastore 210 becomes full, the network environment profile datastore 210 discards data stored therein in accordance with an applicable criteria (e.g., older entry over newer entry for all entries or with respect to each network environment identifier).

The comparative analysis engine 212 is intended to represent hardware configured to perform a dynamic comparative network health analysis of a network environment to generate a dynamic comparative analysis, based on network environment profiles of network environments stored in the network environment profile datastore 210. In a specific implementation, in generating a dynamic comparative analysis, the comparative analysis engine 212 calculates deviation of values such as an average ($\mu$) and a standard deviation ($\sigma$), with respect to one or more of network environment parameters (dynamic and/or static) and with respect to one or more of network environment type (e.g., entity, facility, network device), and classifies a network environment in one of a plurality of categories. For example, with respect to a network environment parameter, the comparative analysis engine 212 classifies a network environment having a value of a network environment parameter over $\mu+2\sigma$ as a first category (e.g., red zone), a network environment having a value of a network environment parameter over $\mu+\sigma$ and below $\mu+2\sigma$ as a second category (e.g., yellow zone), and a network environment having a value of a network environment parameter below $\mu+\sigma$ as a third category (e.g., green zone).

In a specific implementation, in generating a dynamic comparative analysis, the comparative analysis engine 212 determines a health metric of a network environment based on a classification of a network environment parameter. For example, with respect to a network environment parameter in the above example, the comparative analysis engine 212 determines a lower health metric for the first category than the second category, and a lower health metric for the second category than the third category. In a specific implementation, in generating a dynamic comparative analysis, the comparative analysis engine 212 calculates a total health metric based on sum or weighted sum of health metrics of a plurality of network environment parameters and classifies the total health metric into one of a plurality of categories (e.g., ideal, non-ideal, etc.) based on comparison with a health level threshold. Depending upon implementation-specific or other considerations, a higher total health metric may indicate a better health condition of a network environment. In a specific implementation, the comparative analysis engine 212 is configured to dynamically update a dynamic comparative analysis of a network environment periodically with a predetermined interval (e.g., 10-30 sec).

In a specific implementation, the comparative analysis engine 212 is configured to store the generated dynamic comparative analysis of a network environment in the comparative analysis datastore 214. The comparative analysis datastore 214 is intended to represent a datastore configured to store dynamic comparative analyses generated by the comparative analysis engine 212. In a specific implementation, the comparative analysis datastore 214 is configured to form a network environment profile table including a plurality of entries each of which includes a value of a network environment identifier, a classification and a health metric with respect to one or more network environment parameters, and a total health metric and a classification thereof. In a specific implementation, the network environment profile table may also include information included in a network environment profile of the corresponding network environment. In a specific implementation, when the comparative analysis datastore 214 becomes full, which may be determined by comparing the amount of data to a physical or logical datastore capacity, the comparative analysis datastore 214 discards data stored therein in accordance with an applicable criteria (e.g., older entry over newer entry for all entries or with respect to each network environment identifier.).

The remedial plan generation engine 216 is intended to represent hardware configured to generate a remedial plan of an existing network environment, which is deemed to have an unhealthy network condition, based on a dynamic comparative analysis stored in the comparative analysis datastore 214 coupled thereto. In a specific implementation, in generating a remedial plan of an existing network environment, the remedial plan generation engine 216 extracts exemplary network environment profile(s) of healthy network environment(s) having similar features as a network environment profile of the existing network environment. In a specific implementation, the remedial plan generation engine 216 generates the remedial plan based on the exemplary network environment profile(s) of healthy network environment(s). For example, when exemplary network environment profile(s) of healthy network environment(s) have a same or similar number of APs in a same or similar area size of a network environment, the remedial plan may include a change of locations of APs in the existing network environment. As used in this paper, exemplary can mean average, mean, or better than average or mean. In a specific implementation, the remedial plan generation engine 216 is configured to generate a remedial plan in response to a triggering event, such as a request from an applicable source such as an administrator and/or a network provider of a corresponding network environment or other network environments, and in consideration of when a health metric of a network environment parameter and/or a total health metric of the network environment reaches a certain value or enters into a certain category (e.g., non-ideal for total health metric). In a specific implementation, the remedial plan generation engine 216 is configured to store the generated remedial plan in the network plan datastore 218 coupled thereto.

The new plan generation engine 220 is intended to represent hardware configured to generate a new plan of a network environment to be configured based on a dynamic comparative analysis stored in the comparative analysis datastore 214 coupled thereto. In a specific implementation, in generating a new plan of a network environment, the new plan generation engine 220 extracts exemplary network environment profile(s) of healthy network environment(s) having similar features (e.g., static network environment parameters) as a network environment profile of the existing network environment. In a specific implementation, the new plan generation engine 220 generates the new plan based on the exemplary network environment profile(s) of healthy network environment(s). For example, when exemplary network environment profile(s) of healthy network environment(s) have the same or similar number of APs in the same or similar area size of a network environment, the new plan may include locations of APs in the existing network environment in the same or similar manner as locations of APs in the exemplary network environment profile(s) of healthy network environment(s). In a specific implementation, the new plan generation engine 220 is configured to generate a new plan in response to a triggering event, such as a request from an applicable source such as an administrator and/or a network provider of a corresponding network environment or other network environments. In a specific implementation, the new plan generation engine 220 is configured to store the new plan in the network plan datastore 218.

The network plan datastore 218 is intended to represent a datastore configured to store a remedial plan generated by the remedial plan generation engine 216, and/or a new plan generated by the new plan generation engine 220. In a specific implementation, the network plan datastore 218 is configured to form a network environment profile table including a plurality of entries each of which includes a value of a network environment identifier, proposed parameter values of static network environment parameters, a topology of network device(s) in a network environment, and/or a floor plan and locations of network device(s) in the network environment. In a specific implementation, when the network plan datastore 218 becomes full, the network plan datastore 218 discards data stored therein in accordance with an applicable criteria (e.g., older entry over newer entry for all entries or with respect to each network environment identifier).

The analysis and plan providing engine 222 is intended to represent hardware configured to provide dynamic comparative analyses of network environments stored in the comparative analysis datastore 214 and/or remedial plan and/or new plan of network environments stored in the network plan datastore 218. In a specific implementation, the analysis and plan providing engine 222 provides a dynamic comparative analysis of a network environment upon an applicable triggering event, such as a request for a dynamic comparative analysis from an applicable source such as a device associated with an administrator and/or a network provider of the corresponding network environment or other network environments, and in consideration of when a health metric of a network environment parameter and/or a total health metric of the network environment reaches a certain value or enters into a certain category (e.g., non-ideal for total health metric). In a specific implementation, the analysis and plan providing engine 222 provides a remedial plan and/or a new plan, or data associated therewith, of a network environment upon the applicable triggering event.

In a specific implementation, the dynamic comparative analysis provided by the analysis and plan providing engine 222 is presented in a GUI of an applicable device associated with an administrator and/or a network provider of the corresponding network environment or other network environments. Similarly, the remedial plan and/or new plan of network environment provided by the analysis and plan providing engine 222 is presented in a GUI of an applicable device associated with an administrator and/or a network provider of the corresponding network environment or other network environments. In a specific implementation, a GUI of a dynamic comparative analysis and/or a remedial and/or new plan of a network environment may be presented to a user of a client device connected in a network environment subjected to a dynamic comparative network health analysis, such that the user of a client device can find health of the client device, health of AP connected thereto, a health of other client devices connected to the same AP. In a specific implementation, a GUI of a dynamic comparative analysis and/or a remedial and/or new plan of a network environment may include one or more of a floorplan of a facility, a deployment map of network devices overlaid on the floor plan, and a topology of network devices at the facility. In a specific implementation, a GUI of a dynamic comparative analysis and/or a remedial and/or new plan of a network environment may be presented through a dedicated application running on a local device, and/or through a web browser running on a local device.

In an example of operation of the example system shown in FIG. 2, the network environment parameterization engine 204 parameterizes network environment parameters, dynamic and static, from the network environment, which is represented as the network environment datastore in the example of FIG. 2, and stores the network environment parameters in the network environment parameter datastore 206. The profile creation engine 208 creates network environment profiles based on the network environment parameters and stores the network environment profiles in the network environment profile datastore 210. The comparative analysis engine 212 performs a dynamic comparative network health analysis of a network environment to generate a dynamic comparative analysis, based on the network environment profiles, and stores the dynamic comparative analysis in the comparative analysis datastore 214. The remedial plan generation engine 216 generates a remedial plan of an existing network environment based on the dynamic comparative analysis stored in the comparative analysis datastore 214, and stores the remedial plan in the network plan datastore 218, or the new plan generation engine 220 generates a new plan of a new network environment based on the dynamic comparative analysis stored in the comparative analysis datastore 214, and stores the new plan in the network plan datastore 218. In the example of operation of the example system shown in FIG. 2, the analysis and plan providing engine 222 provides the dynamic comparative analysis stored in the comparative analysis datastore 214 and/or the remedial plan or the new plan in the network plan datastore 218 for presentation on GUIs.

Figure 3:
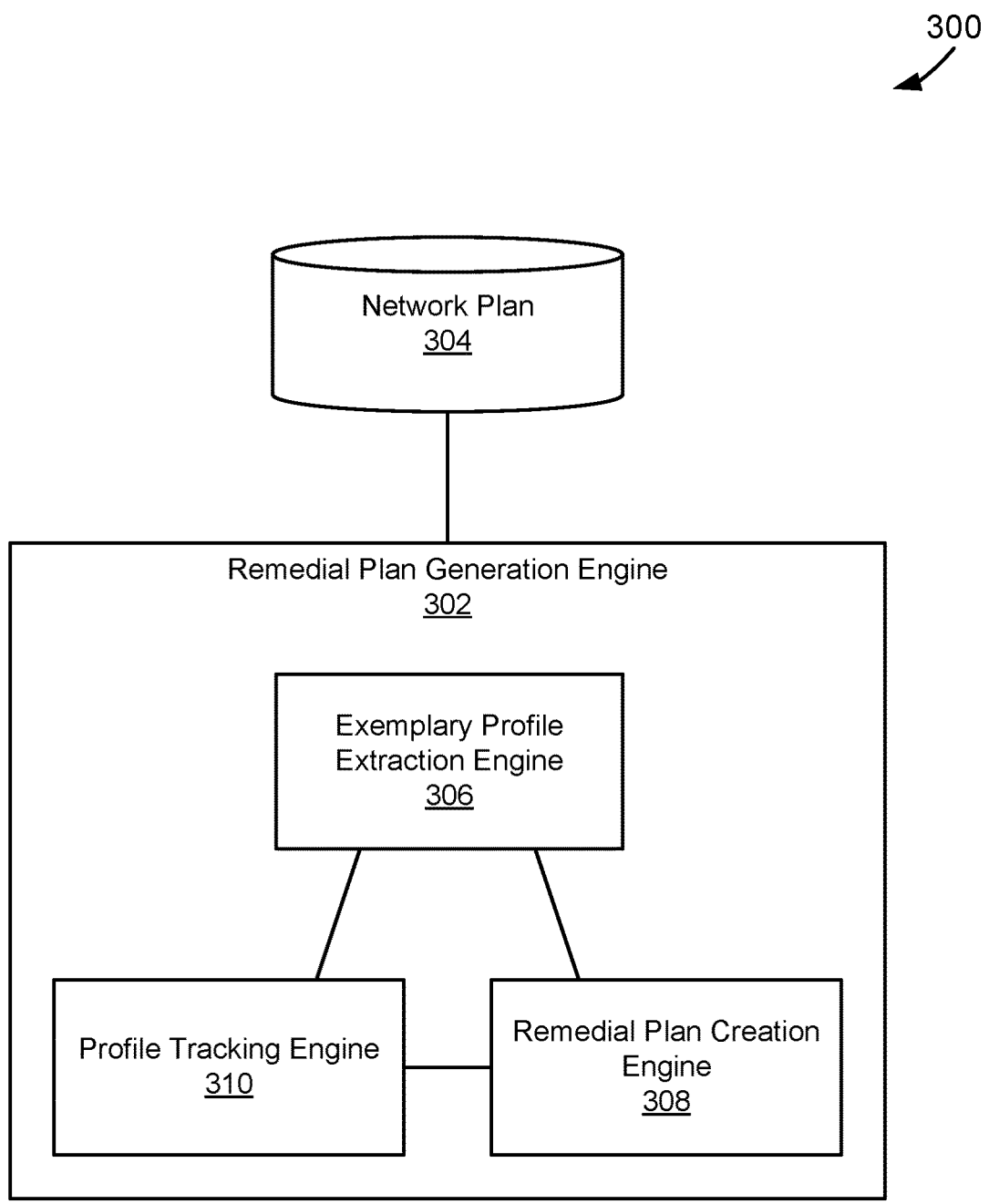
FIG. 3 depicts a diagram of an example of a sub-system for generating a remedial plan of a network environment based on a dynamic comparative network health analysis.

FIG. 3 depicts a diagram 300 of an example of a subsystem for generating a remedial plan of a network environment using dynamic comparative network health analysis. The diagram 300 includes a remedial plan generation engine 302 and network plan datastore 304 coupled to the remedial plan generation engine 302. In a specific implementation, the remedial plan generation engine 302 and the network plan datastore 304 respectively correspond to the remedial plan generation engine 216 and the network plan datastore 218 in FIG. 2.

The remedial plan generation engine 302 is intended to represent hardware configured to generate a remedial plan for an existing network environment. The remedial plan generation engine 302 includes an exemplary profile extraction engine 306, a remedial plan creation engine 308 coupled to the exemplary profile extraction engine 306, and a profile tracking engine 310 coupled to the exemplary profile extraction engine 306 and the remedial plan creation engine 308. In a specific implementation, the remedial plan generation engine 302 generates a remedial network environment plan as an optional reconfiguration of an existing network environment.

In a specific implementation, the remedial plan generation engine 302 is configured to identify an existing network environment as a target network environment to be reconfigured using its network environment profile. The remedial plan generation engine 302 may identify an existing network environment as a target network environment when the network environment profile of the existing network environment meets certain criteria, such as when a comparative network health metric exceeds a network environment remediation threshold (e.g., the comparative network health metric is 30% to 70% with respect to bandwidth usage). In another example, the certain criteria includes one or more of a criteria that the number of client devices per AP is over a network environment remediation threshold, a criteria that the number of APs connected to client devices more than a first network environment remediation threshold is over a second network environment remediation threshold, a criteria that a bandwidth usage of an AP is over a network environment remediation threshold, and a criteria that the number of APs of which bandwidth usage is over a first network environment remediation threshold is over a second network environment remediation threshold. In another example, the certain criteria includes a criteria that the number (or ratio) of client devices experiencing connection below a certain bandwidth is over a network environment remediation threshold. Depending upon implementation-specific or other considerations, the remedial plan generation engine 302 determines an existing network environment as a target network environment based on a user request. For example, a user request may designate an existing network environment to be reconfigured based on its insufficient network performance.

The exemplary profile extraction engine 306 is intended to represent hardware configured to select (extract) one or more exemplary network environment profiles having corresponding (e.g., similar) features as a network environment profile of the target network environment. In a specific implementation, the corresponding features may be determined using an exemplary profile extraction model. The exemplary profile extraction model may or may not specify inclusion of network environment profiles having the same static network environment parameters. For example, static network environment parameters may include one or more of a geographic location (e.g., state, city, etc.), a type of use (e.g., private office space), a type of the network environment (e.g., a floor of a building), a type of industry (e.g., education, healthcare, manufacturing, office, stores, etc.), a type of wireless connection (e.g., 801.11ac), a size of organization (e.g., 1-10 APs, 11-100 APs, 101-500 APs, etc.), an area of the network environment (e.g., a footprint), a number (or range) of APs, and an expected number (or range) of client devices. In a specific implementation, the exemplary profile extraction model specifies inclusion of network environment profiles that meet a certain criteria. For example, the certain criteria include a number of client devices per AP is below an exemplary profile threshold, a number of APs connected to client devices over a first exemplary profile threshold is below a second exemplary profile threshold, a bandwidth usage of an AP is below an exemplary profile threshold, and a number of APs of which bandwidth usage is over a first exemplary profile threshold is below a second exemplary profile threshold. In another example, the certain criteria include a number (or ratio) of connected client devices below a certain bandwidth is below an exemplary profile threshold.

The remedial plan creation engine 308 is intended to represent hardware configured to generate a remedial plan of a target network environment using selected exemplary network profile(s). In a specific implementation, the remedial plan of the target network environment includes a proposal to change a current network environment configuration. Depending upon implementation-specific or other considerations, the proposal may include increasing or decreasing a number of APs, changing location(s) of existing AP(s), changing wireless communication type (e.g., 801.11ac to 801.11b/g/n), changing a network provider, installation of equipment (e.g. a metal wall) to reduce noise, and so on.

In a specific implementation, the remedial plan creation engine 308 is configured to cause a GUI for a remedial plan of a target network environment to be presented on an applicable destination such as a device associated with an administrator and/or a network provider of the target network environment. For example, the remedial plan creation engine 308 can cause data of the GUI for the remedial plan to be provided to the applicable destination, such that the applicable destination can present the GUI. Depending upon implementation-specific or other considerations, upon reviewing a remedial plan, an applicable entity, such as an administrator and/or a network provider, can trigger reconfiguration of the target network environment in accordance with the remedial plan.

The profile tracking engine 310 is intended to represent hardware configured to track a network environment profile of a target network environment, which has been caused to be reconfigured based on a remedial plan. In a specific implementation, in tracking a network environment profile of a target network environment, the profile tracking engine 310 causes a network environment parameterization engine (e.g., the network environment parameterization engine 204 in FIG. 2) to parameterize network environment data to obtain dynamic and/or static network environment parameters of the target network environment and causes a profile creation engine (e.g., the profile creation engine 208 in FIG. 2) to update the network environment profile of the target network environment. In a specific implementation, in tracking the network environment profile of the target network environment, the profile tracking engine 310 compares the network environment profile of the target network environment before and after the remedial plan was implemented, and determines an effectiveness metric of the remedial plan. In a more specific implementation, the effectiveness metric may be calculated based on a ratio or an amount of increase of a comparative network health metric (e.g., from 30% to 70%) with respect to a certain criteria (e.g., bandwidth usage). In a specific implementation, when a remedial plan is partially implemented, the profile tracking engine 310 determines an effectiveness metric of the partially-implemented remedial plan.

In a specific implementation, the exemplary profile extraction engine 306 is configured to update (modify) an exemplary profile extraction model for extracting exemplary profiles using a tracked network environment profile of a target network environment. In a specific implementation, when the effectiveness metric of the remedial plan shows improvement in network performance, weights of network environment parameters employed for extracting exemplary profiles may be relatively increased, and/or weights of network environment parameters not employed for extracting exemplary profiles may be relatively decreased. When the effectiveness metric of the remedial plan shows non-improvement or detriment in network performance, weights of network environment parameters employed for extracting exemplary profiles may be relatively decreased, and/or weights of network environment parameters not employed for extracting exemplary profiles may be relatively increased. When the effectiveness metric of the remedial plan shows improvement in network performance, inclusion of network environment parameters employed for extracting exemplary profiles is confirmed, and/or exclusion of network environment parameters not employed for extracting exemplary profiles is confirmed. When the effectiveness metric of the remedial plan shows non-improvement or detriment in network performance, exclusion of network environment parameters employed for extracting exemplary profiles is reevaluated, and/or inclusion of network environment parameters not employed for extracting exemplary profiles is reevaluated.

In an example of operation of the example system shown in FIG. 3, the remedial plan generation engine 302 determines an existing network environment as a target network environment to be reconfigured using its network environment profile. The exemplary profile extraction engine 306 selects (extracts) one or more exemplary network environment profiles having corresponding (e.g., similar) features as a network environment profile of the target network environment. The remedial plan creation engine 308 generates a remedial plan of the target network environment using the exemplary network environment profile(s), and causes the target network environment to be reconfigured based on the generated remedial plan, which is provided to an applicable entity. The profile tracking engine 310 tracks the network environment profile of the target network environment that has been caused to be reconfigured. The exemplary profile extraction engine 306 then updates an exemplary profile extraction model used for extracting exemplary profiles based on the tracked network environment profile of the target network environment.

Figure 4:
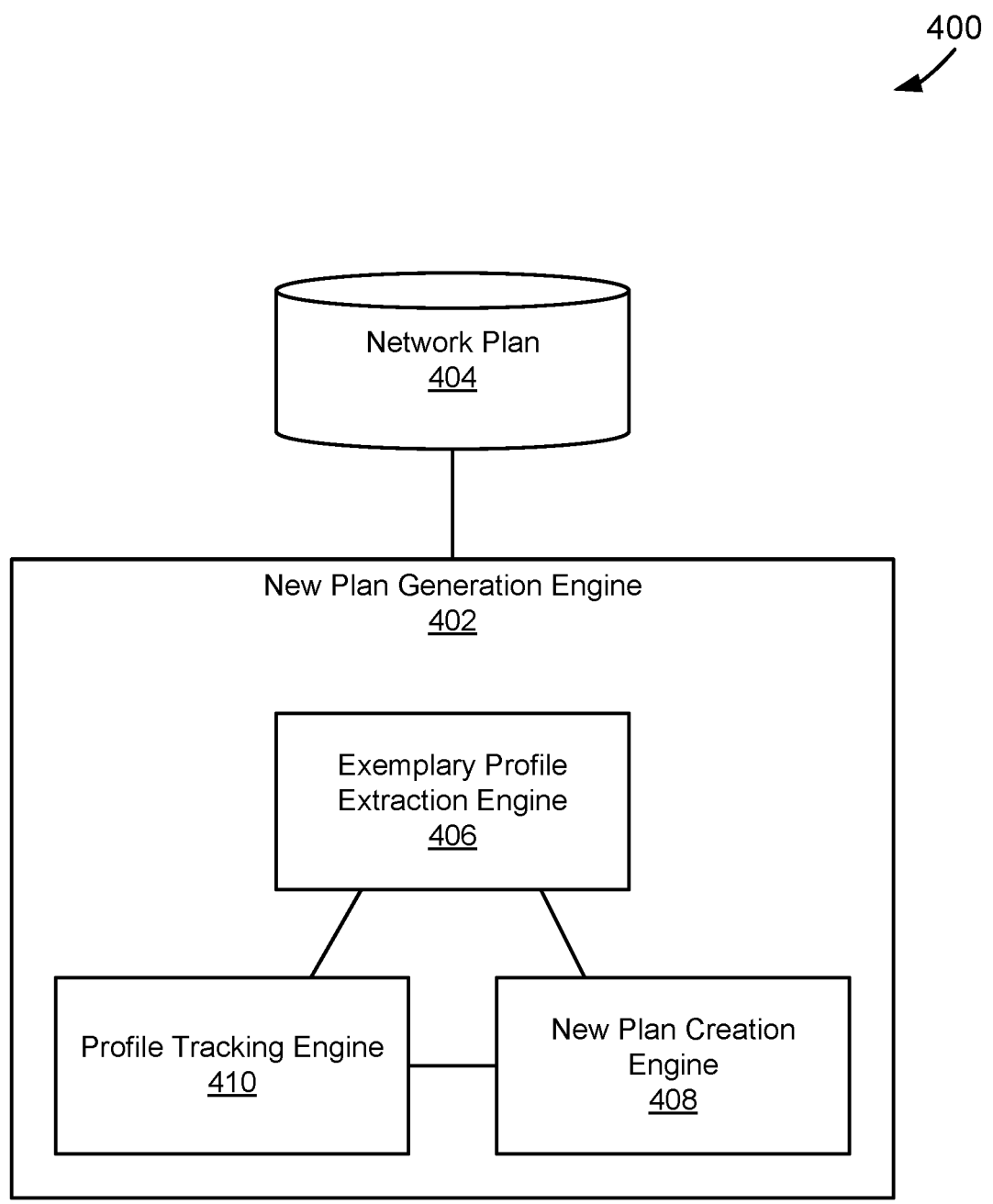
FIG. 4 depicts a diagram of an example of a sub-system for generating a new plan of a network environment based on a dynamic comparative network health analysis.

FIG. 4 depicts a diagram 400 of an example of a subsystem for generating a new plan of a network environment based on a dynamic comparative network health analysis. The diagram 400 includes a new plan generation engine 402 and a network plan datastore 404 coupled to the new plan generation engine 402. In a specific implementation, the new plan generation engine 402 and the network plan datastore 404 respectively correspond to the new plan generation engine 220 and the network plan datastore 218 in FIG. 2.

The new plan generation engine 402 is intended to represent hardware configured to generate a new plan for a network environment. In the example of FIG. 4, the new plan generation engine 402 includes an exemplary profile extraction engine 406, a new plan creation engine 408 coupled to the exemplary profile extraction engine 406, and a profile tracking engine 410 coupled to the exemplary profile extraction engine 406 and the new plan creation engine 408. In a specific implementation, the new plan generation engine 302 generates a new network environment plan as an optional configuration a network environment.

The new plan generation engine 402 is intended to represent hardware configured to identify a network environment as a target network environment to be configured. For example, a user request may designate a network environment to be configured and its static network environment parameter(s), such as a geographic location (e.g., state, city, etc.), a type of use (e.g., private office space), a type of industry (e.g., education, healthcare, manufacturing, office, stores, etc.), a type of the network environment (e.g., a floor of a building), a type of wireless connection (e.g., 801.11ac), a size of organization (e.g., 1-10 APs, 11-100 APs, 101-500 APs, etc.), an area of the network environment (e.g., a footprint), and the number (or range) of APs, and expected number (or range) of client devices.

The exemplary profile extraction engine 406 is intended to represent hardware configured to select (extract) one or more exemplary network environment profiles having corresponding (e.g., similar) features as network environment parameters of the target network environment. In a specific implementation, the corresponding features are determined using an exemplary profile extraction model. The exemplary profile extraction model may or may not specify inclusion of network environment profiles having the same static network environment parameters. For example, static network environment parameters include one or more of a geographic location (e.g., state, city, etc.), a type of use (e.g., private office space), a type of the network environment (e.g., a floor of a building), a type of industry (e.g., education, healthcare, manufacturing, office, stores, etc.), a type of wireless connection (e.g., 801.11ac), a size of organization (e.g., 1-10 APs, 11-100 APs, 101-500 APs, etc.), an area of the network environment (e.g., a footprint), a number (or range) of APs, and an expected number (or range) of client devices. The exemplary profile extraction model may or may not specify inclusion of network environment profiles that meet a certain criteria. For example, the certain criteria may include one or more exemplary profile thresholds.

The new plan creation engine 408 is intended to represent hardware configured to generate a new plan of a target network environment using one or more exemplary network profile(s). In a specific implementation, a new network environment plan for a target network environment includes a proposal for configuration of the new network environment. Depending upon implementation-specific or other considerations, the proposal may include a number of AP(s), location(s) of AP(s), wireless communication type (e.g., 801.11ac to 801.11b/g/n), a network provider, equipment (e.g. a metal wall) to reduce noise, and so on.

In a specific implementation, the new plan creation engine 408 is configured to cause a GUI for the new plan of the target network environment to be presented on an applicable destination such as a device associated with an administrator and/or a network provider of the target network environment. For example, the new plan creation engine 408 can cause data of the GUI for the new plan to be transmitted to the applicable destination, such that the applicable destination can present the GUI with the data. Depending upon implementation-specific or other considerations, upon reviewing the new plan, the target network environment may be configured by an applicable entity, such as an administrator and/or a network provider, in accordance with the provided new plan.

The profile tracking engine 410 is intended to represent hardware configured to track the network environment profile of the target network environment, which has been caused to be configured based on the new plan, after the new plan was provided. In a specific implementation, in tracking a network environment profile of a target network environment, the profile tracking engine 410 causes a network environment parameterization engine (e.g., the network environment parameterization engine 204 in FIG. 2) to parameterize network environment data to obtain dynamic and/or static network environment parameters of the target network environment and causes a profile creation engine (e.g., the profile creation engine 208 in FIG. 2) to update the network environment profile of the target network environment. In a specific implementation, in tracking a network environment profile of a target network environment, the profile tracking engine 410 compares a network environment profile (in particular, dynamic network environment parameters) of the target network environment before and after the new plan was implemented with the network environment profile(s) (in particular, dynamic network environment parameters) of the extracted exemplary network environment profile(s), and determines an effectiveness metric of the new plan. In a more specific implementation, the effectiveness metric may be calculated using proximity of a comparative network health metric of the new network environment to a certain threshold (e.g. 80%) with respect to a certain criteria (e.g., bandwidth usage). In a specific implementation, when the new plan was partially implemented, the profile tracking engine 410 may determine an effectiveness metric of the partially-implemented new plan.

In a specific implementation, the exemplary profile extraction engine 406 is configured to update (modify) a profile extraction model for extracting exemplary profiles using a tracked network environment profile of the target network environment. In a specific implementation, when the effectiveness metric of the new plan falls within an exemplary network performance range, weights of network environment parameters employed for extracting exemplary profiles may be relatively increased and/or weights of network environment parameters not employed for extracting exemplary profiles may be relatively decreased. When the effectiveness metric of the new plan falls outside of an exemplary network performance range, weights of network environment parameters employed for extracting exemplary profiles may be relatively decreased and/or weights of network environment parameters not employed for extracting exemplary profiles may be relatively increased. When the effectiveness metric of the new plan falls within an exemplary network performance range, inclusion of network environment parameters employed for extracting exemplary profiles is confirmed and/or exclusion of network environment parameters not employed for extracting exemplary profiles is confirmed. When the effectiveness metric of the new plan falls outside of an exemplary network performance, exclusion of network environment parameters employed for extracting exemplary profiles is reevaluated and/or inclusion of network environment parameters not employed for extracting exemplary profiles is reevaluated.

In an example of operation of the example system shown in FIG. 4, the exemplary profile extraction engine 406 identifies a new network environment to be configured as a target network environment to be configured using its network environment profile (in particular, static network environment parameter(s) thereof), and selects (extracts) one or more exemplary network environment profiles having corresponding (e.g., similar) features as the network environment profile of the target network environment. The new plan creation engine 408 generates a new plan of the target network environment based on the selected exemplary network environment profile(s), and causes the target network environment to be configured based on the generated new plan, which is provided to an applicable entity. The profile tracking engine 410 tracks the network environment profile of the target network environment that has been caused to be configured after the new plan was provided. The exemplary profile extraction engine 406 updates an exemplary profile extraction model used for extracting exemplary profiles based on the tracked network environment profile of the target network environment.

Figure 5:
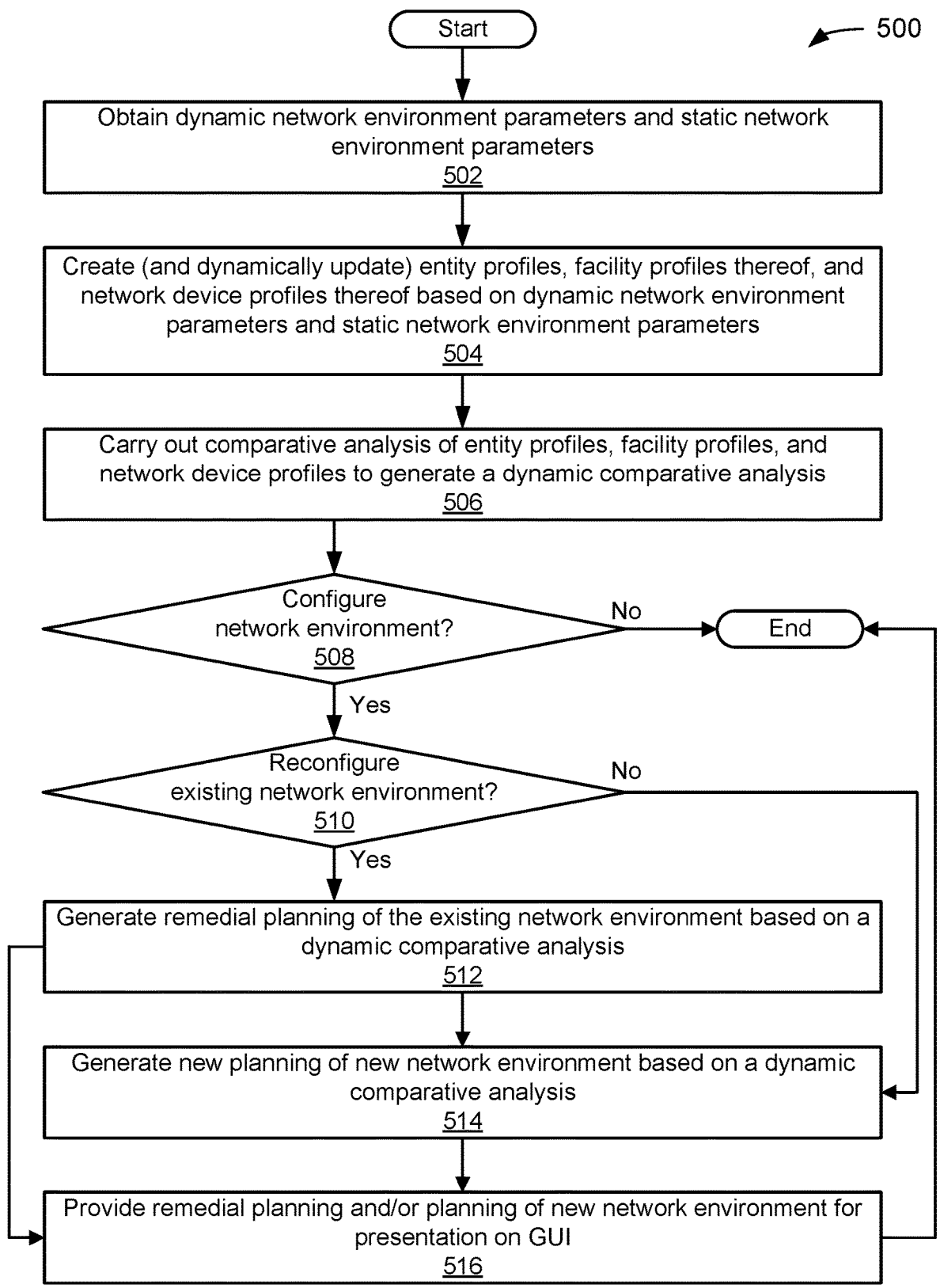
FIG. 5 depicts a flowchart of an example of a method for providing a dynamic comparative network health analysis of a network environment.

FIG. 5 depicts a flowchart 500 of an example of a method for providing a dynamic comparative network health analysis of a network environment. This flowchart and the other flowcharts described in this paper illustrate modules (and potentially decision points) organized in a fashion that is conducive to understanding. It should be recognized, however, that the modules can be reorganized for parallel execution, reordered, modified (changed, removed, or augmented), where circumstances permit. The flowchart 500 begins at module 502 with obtaining dynamic network environment parameters and static network environment parameters. An applicable engine such as the parameter obtaining engine 206 in FIG. 2 obtains the dynamic network environment parameters and the static network environment parameters. In a specific implementation, the dynamic network environment parameters are obtained from a parameter report transmitted from a network environment (e.g., AP, switch, etc.) and/or based on analysis of data traffic through the network environment. In a specific implementation, the static network environment parameters are obtained from the parameter report transmitted from the network environment and/or user inputs (e.g., administrator's inputs).

The flowchart 500 continues to module 504 with creating (and dynamically updating) network environment profiles such as entity profiles, facility profiles thereof, and network device profiles thereof, based on the obtained dynamic network environment parameters and the obtained static network environment parameters. An applicable engine such as the profile creation engine 208 in FIG. 2 creates (and dynamically updates) network environment profiles, based on obtained dynamic network environment parameters and obtained static network environment parameters.

The flowchart 500 continues to decision point 506 with carrying out comparative analysis of network environment profiles, such as entity profiles, facility profiles, and network device profiles, to generate a dynamic comparative analysis. An applicable engine such as the comparative analysis engine 212 in FIG. 2 carries out comparative analysis of network environment profiles to generate a dynamic comparative analysis. In some specific implementations, the generated dynamic comparative analysis is provided for presentation on a GUI. An applicable engine such as the analysis and plan providing engine 222 in FIG. 2 provides the generated dynamic comparative analysis for presentation on the GUI.

The flowchart 500 continues to decision point 508 with determining whether or not a network environment is configured (reconfigured). An applicable engine such as the remedial plan generation engine 216 and/or the new plan generation engine 220 in FIG. 2 determines whether or not a environment is configured (reconfigured). When it is determined that a network environment is configured (reconfigured), the flowchart 500 continues to decision point 510; when it is determined that a network environment is not configured (reconfigured), the flowchart 500 ends.

The flowchart 500 continues to decision point 510 with determining whether or not an existing network environment is to be reconfigured. An applicable engine such as the remedial plan generation engine 216 and/or the new plan generation engine 220 in FIG. 2 determines whether or not an existing network environment is to be reconfigured. When it is determined that an existing network environment is to be reconfigured, the flowchart 500 continues to module 512; when it is determined that an existing network environment is not to be reconfigured, the flowchart 500 continues to module 514.

The flowchart 500 continues to module 512 with generating a remedial plan of an existing network environment based on a dynamic comparative analysis. An applicable engine such as the remedial plan generation engine 216 in FIG. 2 generates a remedial plan of an existing network environment based on a dynamic comparative analysis.

The flowchart 500 continues to module 514 with generating a new plan of a new network environment based on a dynamic comparative analysis. An applicable engine such as the new plan generation engine 220 in FIG. 2 generates a new plan of a new network environment based on a dynamic comparative analysis.

The flowchart 500 continues to module 516 with providing a remedial plan and/or plan of new network environment for presentation on a GUI. An applicable engine such as the analysis and plan providing engine 222 in FIG. 2 provides a remedial plan and/or new network environment plan, or data associated therewith, for presentation on the GUI.

Figure 6:
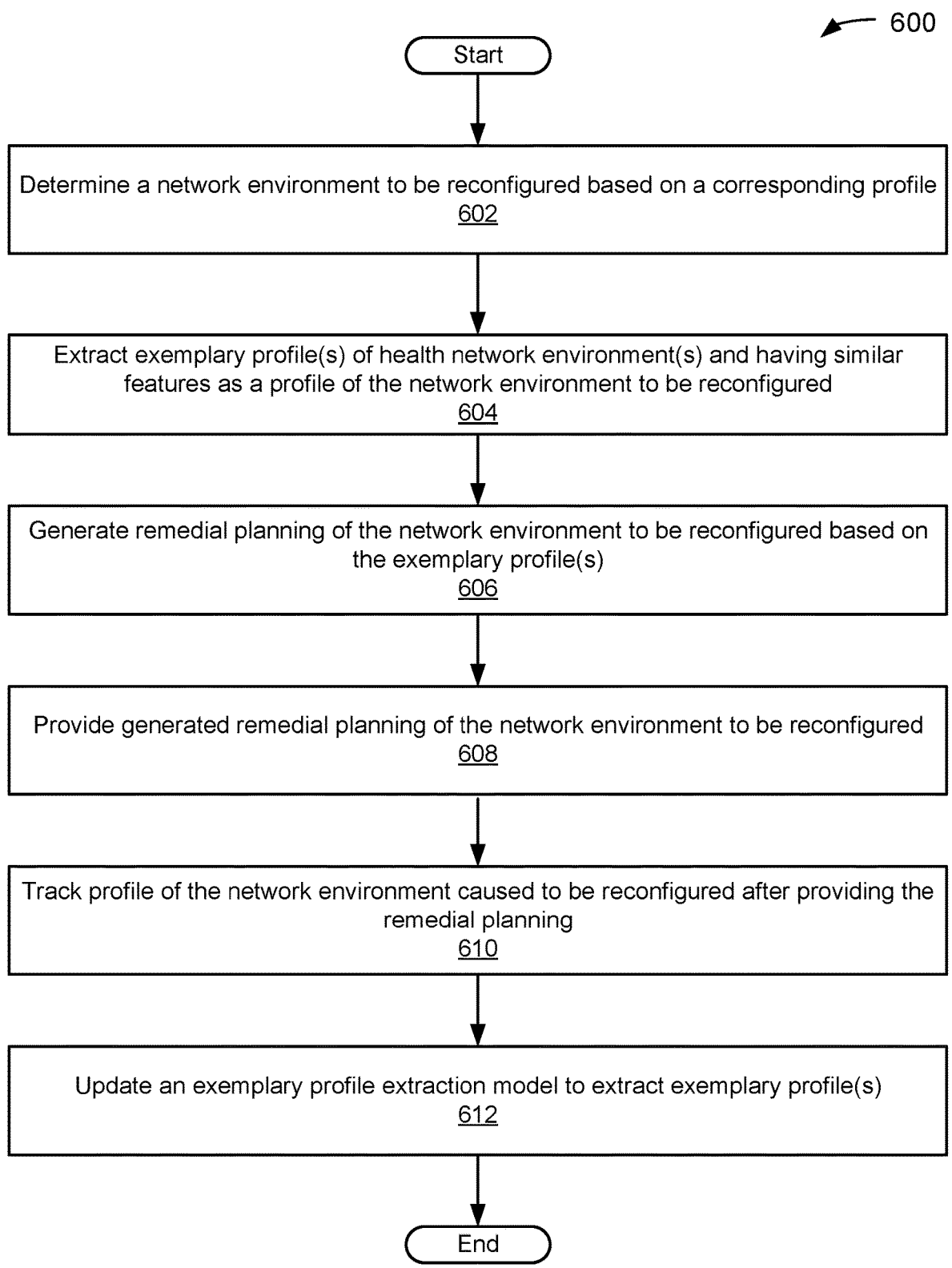
FIG. 6 depicts a flowchart of an example of a method for generating a remedial plan of a network environment based on a dynamic comparative network health analysis.

FIG. 6 depicts a flowchart 600 of an example of a method for generating a remedial plan of a network environment based on a dynamic comparative network health analysis. The flowchart 600 begins at module 602 with determining a network environment to be reconfigured (modified) based on a corresponding profile. An applicable engine such as the remedial plan generation engine 216 in FIG. 2 and/or the remedial plan generation engine 302 in FIG. 3 determines a network environment to be reconfigured (modified) based on a corresponding profile.

The flowchart 600 continues to module 604 with extracting exemplary profile(s) of healthy network environment(s) and having similar features as a profile of the network environment to be reconfigured (modified). An applicable engine such as the remedial plan generation engine 216 in FIG. 2 and/or the exemplary profile extraction engine 306 in FIG. 3 extracts exemplary profile(s) of healthy network environment(s) and having similar features as a profile of the network environment to be reconfigured.

The flowchart 600 continues to module 606 with generating a remedial plan of the network environment to be reconfigured based on the exemplary profile(s). An applicable engine such as the remedial plan generation engine 216 in FIG. 2 and/or the remedial plan creation engine 308 in FIG. 3 generates a remedial plan of the network environment to be reconfigured based on the exemplary profile(s).

The flowchart 600 continues to module 608 with providing a generated remedial plan of the network environment to be reconfigured (modified). An applicable engine such as the analysis and plan providing engine 222 in FIG. 2 provides the generated remedial plan of the network environment to be reconfigured (modified). In a specific implementation, the provided remedial plan of the network environment causes the network environment to be reconfigured according to the provided remedial plan by an applicable party, such as a network administrator and a network provider.

The flowchart 600 continues to module 610 with tracking a network environment profile of the network environment caused to be reconfigured (modified) after the remedial plan is provided. An applicable engine such as the remedial plan generation engine 216 in FIG. 2 and/or the profile tracking engine 310 in FIG. 3 tracks a network environment profile of the network environment caused to be reconfigured (modified).

The flowchart 600 continues to module 612 with updating an exemplary profile extraction model to extract exemplary profile(s). An applicable engine such as the remedial plan generation engine 216 in FIG. 2 and/or the exemplary profile extraction engine 306 in FIG. 3 updates an exemplary profile extraction model to extract exemplary profile(s).

Figure 7:
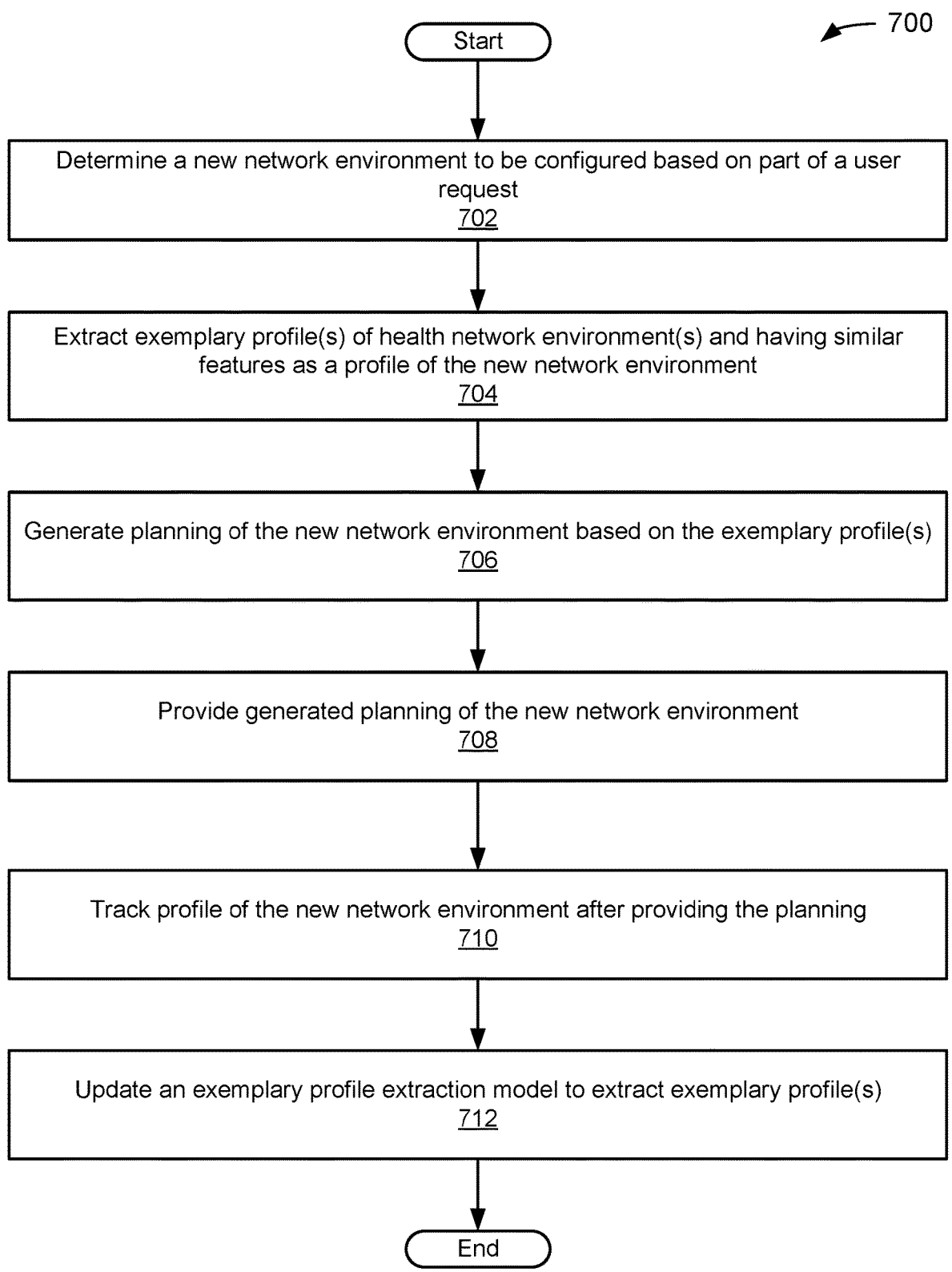
FIG. 7 depicts a flowchart of an example of a method for generating a new plan of a network environment based on a dynamic comparative network health analysis.

FIG. 7 depicts a flowchart 700 of an example of a method for generating a new plan of a new network environment based on a dynamic comparative network health analysis. The flowchart 700 begins at module 702 with determining a new network environment to be configured based on a user request. An applicable engine such as the new plan generation engine 220 in FIG. 2 and/or the new plan generation engine 402 in FIG. 4 determines a network environment to be configured based on a user request.

The flowchart 700 continues to module 704 with extracting exemplary profile(s) of healthy network environment(s) and having similar features as a profile of the new network environment to be configured. An applicable engine such as the new plan generation engine 220 in FIG. 2 and/or the exemplary profile extraction engine 406 in FIG. 4 extracts exemplary profile(s) of healthy network environment(s) and having similar features as a profile of the new network environment to be configured.

The flowchart 700 continues to module 706 with generating a new plan of the new network environment to be configured based on the exemplary profile(s). An applicable engine such as the new plan generation engine 220 in FIG. 2 and/or the new plan creation engine 408 in FIG. 4 generates a new plan of the new network environment to be configured based on the exemplary profile(s).

The flowchart 700 continues to module 708 with providing a generated new plan of the new network environment to be configured. An applicable engine such as the analysis and plan providing engine 222 in FIG. 2 provides the generated new plan of the new network environment to be configured. In a specific implementation, the provided new plan of the new network environment causes the new network environment to be configured according to the provided new plan by an applicable party, such as a network administrator and a network provider.

The flowchart 700 continues to module 710 with tracking a network environment profile of the new network environment caused to be configured after the new plan is provided. An applicable engine such as the new plan generation engine 220 in FIG. 2 and/or the profile tracking engine 410 in FIG. 4 tracks a network environment profile of the new network environment caused to be configured.

The flowchart 700 continues to module 712 with updating an exemplary profile extraction model to extract exemplary profile(s). An applicable engine such as the new plan generation engine 220 in FIG. 2 and/or the exemplary profile extraction engine 406 in FIG. 4 updates an exemplary profile extraction model to extract exemplary profile(s).

These and other examples provided in this paper are intended to illustrate but not necessarily to limit the described implementation. As used herein, the term "implementation" means an implementation that serves to illustrate by way of example but not limitation. The techniques described in the preceding text and figures can be mixed and matched as circumstances demand to produce alternative implementations.

The invention claimed is:

1. A method for providing a dynamic comparative network health analysis of a network environment, the method comprising:
    obtaining dynamic network environment parameters and static network environment parameters of a plurality of network environments;
    creating network environment profiles of each network environment of the plurality of network environments based on the dynamic network environment parameters and the static network environment parameters, wherein the network environment profiles are dynamically updated based on the dynamic network environment parameters and the static network environment parameters;
    generating an overall health metric for each of the network environment profiles of each of the plurality of network environments, the overall health metric being based on a composite of a health metric for each of the dynamic network environment parameters and the static network environment parameters;
    performing a comparative health analysis of network environment profiles of a first network environment of the plurality of network environments with network environment profiles of a second network environment of the plurality of network environments to generate a comparative analysis, wherein performing the comparative health analysis comprises comparing the overall health metric of the first network environment with the overall health metric of the second network environment;
    based on the comparative analysis, determining whether to reconfigure the first network environment or create a new network environment;
    in response to determining to reconfigure the first network environment, generating a remedial plan for the first network environment; and
    in response to determining to create the new network environment, generating a new plan for the new network environment.

2. The method of claim 1, wherein the network environment profiles include entity profiles, facility profiles, network device profiles, or a combination thereof.

3. The method of claim 1, wherein obtaining the dynamic network environment parameters comprises obtaining the dynamic network environment parameters from at least one of network parameter reports transmitted from the plurality of network environments and data traffic through the plurality of network environments.

4. The method of claim 1, wherein obtaining the static network environment parameters comprises obtaining the static network environment parameters from at least one of network parameter reports transmitted from the plurality of network environments and inputs of users of the plurality of network environments.

5. The method of claim 1, wherein the network environment profiles are dynamically updated on a predetermined interval.

6. The method of claim 1, wherein generating the remedial plan or the new plan comprises providing the remedial plan or the new plan for presentation on a graphical user interface (GUI).

7. The method of claim 1, wherein the remedial plan or the new plan is implemented by a network administrator or a network provider.

8. The method of claim 1, further comprising tracking a first network environment profile of the first network environment after the remedial plan or the new plan has been implemented.

9. The method of claim 1, further comprising:
    extracting exemplary network environment profiles of the plurality of network environment profiles, the exemplary network environment profiles corresponding to network environments having an overall health metric above a threshold value and having similar features as a first network environment profile of the first network environment, and
    wherein the generating the remedial plan or the new plan comprises generating the remedial plan or the new plan based on the exemplary network environment profiles.

10. A system for providing a dynamic comparative network health analysis of a network environment, the system comprising:
    a memory; and
    a processor coupled to the memory and configured to:
    obtain dynamic network environment parameters and static network environment parameters of a plurality of network environments;
    create network environment profiles of each network environment of the plurality of network environments based on the dynamic network environment parameters and the static network environment parameters, wherein the network environment profiles are dynamically updated based on the dynamic network environment parameters and the static network environment parameters;
    generate an overall health metric for each of the network environment profiles of each of the plurality of network environments, the overall health metric being based on a composite of a health metric for each of the dynamic network environment parameters and the static network environment parameters;
    perform a comparative health analysis of network environment profiles of a first network environment of the plurality of network environments with network environment profiles of a second network environment of the plurality of network environments to generate a comparative analysis, wherein to perform the comparative health analysis, the processor is configured to compare the overall health metric of the first network environment with the overall health metric of the second network environment;
    determine, based on the comparative analysis, whether to reconfigure the first network environment or to create a new network environment;
    in response to determining to reconfigure the first network environment, generate a remedial plan for the first network environment; and
    in response to determining to create a new network environment, generate a new plan for the new network environment.

11. The system of claim 10, wherein the network environment profiles include entity profiles, facility profiles, network device profiles, or a combination thereof.

12. The system of claim 10, wherein the processor is configured to obtain the dynamic network environment parameters from at least one of network parameter reports transmitted from the plurality of network environments and data traffic through the plurality of network environments.

13. The system of claim 10, wherein the processor is configured to obtain the static network environment parameters from at least one of network parameter reports transmitted from the plurality of network environments and inputs of users of the plurality of network environments.

14. The system of claim 10, wherein the processor is further configured to dynamically update the network environment profiles on a predetermined interval.

15. The system of claim 10, wherein to generate the remedial plan or the new plant, the processor is configured to provide the remedial plan or the new plan for presentation on a graphical user interface (GUI).

16. The system of claim 10, wherein the processor is further configured to track a first network environment profile of the first network environment after the remedial plan or the new plan has been implemented.

17. The system of claim 10, wherein:
the processor is further configured to extract exemplary network environment profiles of the plurality of network environment profiles, the exemplary network environment profiles corresponding to network environments having an overall health metric above a threshold value and having similar features as a first network environment profile of the first network environment; and
to generate the remedial plan, the processor is configured to generate the remedial plan based on the exemplary network environment profiles.

18. The system of claim 10, wherein:
wherein the processor is further configured to extract exemplary network environment profiles of the plurality of network environment profiles, the exemplary network environment profiles corresponding to network environments having an overall health metric above a threshold value and having similar features as a first network environment profile of the first network environment; and
to generate the new plan, the processor is configured to generate the new plan based on the exemplary network environment profiles.

19. A computer program product comprising instructions stored on a non-transitory medium which, when executed by a computer, cause the computer to perform a method comprising:
obtaining dynamic network environment parameters and static network environment parameters of a plurality of network environments;
creating network environment profiles of each network environment of the plurality of network environments based on the dynamic network environment parameters and the static network environment parameters, wherein the network environment profiles are dynamically updated based on the dynamic network environment parameters and the static network environment parameters;
generating an overall health metric for each of the network environment profiles of each of the plurality of network environments, the overall health metric being based on a composite of a health metric for each of the dynamic network environment parameters and the static network environment parameters;
performing a comparative health analysis of network environment profiles of a first network environment of the plurality of network environments with network environment profiles of a second network environment of the plurality of network environments to generate a comparative analysis, wherein performing the comparative health analysis comprises comparing the overall health metric of the first network environment with the overall health metric of the second network environment;
based on the comparative analysis, determining whether to reconfigure the first network environment or create a new network environment;
in response to determining to reconfigure the first network environment, generating a remedial plan for the first network environment; and
in response to determining to create a new network environment, generating a new plan for the new network environment.

20. The A computer program product of claim 19, wherein the health metric for each of the dynamic network environment parameters and the static network environment parameters is based on an average and standard deviation with respect to the dynamic network environment parameters and static network environment parameters of the plurality of network environments.

* * * * *